US008514870B2

(12) United States Patent
Ma et al.

(10) Patent No.: US 8,514,870 B2
(45) Date of Patent: Aug. 20, 2013

(54) METHOD FOR IMPLEMENTING IP MULTIMEDIA SUBSYSTEM REGISTRATION

(75) Inventors: Chunyan Ma, Shenzhen (CN); Bin Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1524 days.

(21) Appl. No.: 11/857,146

(22) Filed: Sep. 18, 2007

(65) Prior Publication Data

US 2008/0039081 A1    Feb. 14, 2008

Related U.S. Application Data

(63) Continuation of application No. PCT/CN2006/001641, filed on Jul. 11, 2006.

(30) Foreign Application Priority Data

Aug. 8, 2005  (CN) .......................... 2005 1 0090109
Nov. 8, 2005  (CN) .......................... 2005 1 0115672

(51) Int. Cl.
*H04L 12/28*    (2006.01)
*H04W 4/00*    (2009.01)

(52) U.S. Cl.
USPC ........ 370/410; 370/426; 370/338; 455/435.1; 455/433

(58) Field of Classification Search
None
See application file for complete search history.

(56) References Cited

U.S. PATENT DOCUMENTS

| 7,177,642 | B2 * | 2/2007 | Sanchez Herrero et al. .......................... 455/435.1 |
| 7,567,796 | B2 * | 7/2009 | Tammi et al. ................. 455/411 |
| 2003/0159067 | A1 * | 8/2003 | Stirbu ........................... 713/201 |
| 2004/0146040 | A1 | 7/2004 | Phan-Anh et al. |
| 2004/0185848 | A1 * | 9/2004 | Phan-Anh et al. ......... 455/435.1 |
| 2004/0196796 | A1 * | 10/2004 | Bajko et al. ................... 370/310 |
| 2005/0141481 | A1 | 6/2005 | Kauppinen |
| 2007/0189215 | A1 | 8/2007 | Wu et al. |

FOREIGN PATENT DOCUMENTS

| CN | 1390017 A | 1/2003 |
| CN | 1642346 A | 7/2005 |
| KR | 20040057858 A | 7/2004 |
| WO | WO 02/19732 A1 | 3/2002 |

(Continued)

OTHER PUBLICATIONS

Convergence Technologies for 3G Networks : IP, UMTS, EGPRS and ATM, Jeffrey Bannister, Paul Mather, Sebastian Coope, May 2004.*

(Continued)

*Primary Examiner* — Jinsong Hu
*Assistant Examiner* — William Nealon
(74) *Attorney, Agent, or Firm* — Leydig, Voit & Mayer, Ltd.

(57) ABSTRACT

A method for implementing an IP Multimedia Subsystem (IMS) registration, includes: a Home Subscriber Server (HSS) recording a current registration state of a User Equipment (UE) in response to receiving a Multimedia Authentication Request (MAR) initiated by a Service Call Session Control Function (S-CSCF) selected for the UE when a first Register request is sent by the UE; in response to receiving a second Register request initiated by an Interrogating Call Session Control Function (I-CSCF), the HSS sends the S-CSCF Name to the I-CSCF when the current registration state of the UE is an assigned S-CSCF state. By the scheme, a same S-CSCF is ensured to be used in the two User Authentication Request/User Authentication Answer (UAR/UAA) procedures of the initial IMS registration procedure, and the initial IMS registration of the UE is implemented successfully.

9 Claims, 3 Drawing Sheets

(56) References Cited

FOREIGN PATENT DOCUMENTS

| WO | WO 02/082731 A1 | 10/2002 |
|---|---|---|
| WO | 02/102107 A1 | 12/2002 |
| WO | WO 03/075596 A1 | 9/2003 |

OTHER PUBLICATIONS

3GPP TS29.228 V5.12.0 (Jun. 2005), 3rd Generation Partnership Project.*

Oh et al., "The Serving CSCF Assignment Algorithm in Wireless IP Multimedia Networks," *Midwest Symposium on Circuits and Systems*, 1(27): 440-445 (Dec. 27, 2003).

3rd Generation Partnership Project, Technical Specification Group Services and System Aspects; 3G security; Access security for IP-based services (Release 6) (3GPP TS 33.203 V6.5.0) (Dec. 2004).

3rd Generation Partnership Project, Technical Specification Group Core Network; IP Multimedia (IM) Subsystem Cx and Dx interfaces; Signalling flows and message contents (Release 6) (3GPP TS 29.228 V6.5.0) (Dec. 2004).

3rd Generation Partnership Project, Technical Specification Group Core Network; IP Multimedia (IM) Subsystem Cx and Dx interfaces; Signalling flows and message contents (Release 6) (3GPP TS 29.228 V5.12.0) (Jun. 2005).

European Patent Office, Examination Report in European Patent Application No. 06753134.3 (Aug. 4, 2010).

State Intellectual Property Office of the People's Republic of China, Written Opinion o f the International Searching Authority in International Patent Application No. PCT/CN2006/001641 (Nov. 2, 2006).

State Intellectual Property Office of the People's Republic of China, First Examination Report in Chinese Patent Application No. 200680011921.1 (Jan. 9, 2009).

State Intellectual Property Office of the People's Republic of China, Second Examination Report in Chinese Patent Application No. 200680011921.1 (Sep. 4, 2009).

State Intellectual Property Office of the People's Republic of China, Third Examination Report in Chinese Patent Application No. 200680011921.1 (Dec. 18, 2009).

* cited by examiner

METHOD FOR IMPLEMENTING IP MULTIMEDIA SUBSYSTEM REGISTRATION

This application is a continuation of International Patent Application No. PCT/CN2006/001641, filed Jul. 11, 2006, which claims priority to Chinese Patent Application No. 200510090109.X, filed Aug. 8, 2005, and Chinese Patent Application No. 200510115672.8, filed Nov. 8, 2005, all of which are hereby incorporated by reference.

FIELD OF THE INVENTION

The present invention relates to the IP (Internet Protocol) Multimedia Subsystem (IMS) technology, and more particularly, to methods for implementing IMS registration.

BACKGROUND OF THE INVENTION

If a User Equipment (UE) needs to use IMS services, the UE should implement the IMS registration. FIG. 1 is a flow chart illustrating the process of implementing initial IMS registration in the prior art. If a UE has acquired an Internet Protocol (IP) connection bearer and found an interface of the IMS system: a Proxy Call Session Control Function (P-CSCF), before the initial IMS registration is implemented. The initial IMS registration includes the following steps.

Steps 100-101: The UE sends a first Register request based on a Session Initialization Protocol (SIP) to the P-CSCF found by the UE, and forwards the first Register request to an Interrogating Call Session Control Function (I-CSCF) via the P-CSCF.

The I-CSCF is a connection point provided for all users connecting to the service provider in an (Internet service provider) ISP network. The first Register request includes an ID and home network name of the UE to be registered. The P-CSCF parses an IP address of the I-CSCF by using a home network name included in the first Register request, and forwards the first Register request to the I-CSCF corresponding to the IP address of the I-CSCF.

Steps 102-103: The I-CSCF initiates to a Home Subscriber Server (HSS) a User Authorization Request (UAR) message; and the HSS returns, according to the current registration state of the UE, the I-CSCF a User Authentication Answer (UAA) message carrying Service Call Session Control Function (S-CSCF) capabilities or an S-CSCF Name.

In the IMS network, the HSS is located in the home network, and is used for storing the data related to subscribers and services, such as subscriber IDs, subscriber registration state information, access parameters, service trigger information. The S-CSCF, which is the core of the IMS network, is located in the home network. The S-CSCF is utilized to control sessions and provide registration services for subscribers.

A user has three registration states: a not registered state that the subscriber establishes no connection with the network, a registered state, and an unregistered state that the subscriber has established a connection with the network, but has not initiated any registration procedure. According to related protocol criterions, the subscriber registration state is changed after the HSS receives a Subscriber Authentication or Cancel Request (SAR) from the S-CSCF. If the UE deregisters from the network, for example, the UE is power-off, a Subscriber Cancel Request is triggered. In response to receiving the Subscriber Cancel Request, the HSS changes the registration state of the UE stored in the HSS to the not registered state. If the UE completes the registration, a subscriber registration request is triggered. In response to receiving the subscriber registration request, the HSS changes the registration state of the UE stored in the HSS to the registered state. If the UE is called, the SAR is triggered. In response to receiving the SAR, the HSS changes the registration state of the UE stored in the HSS to the unregistered state. It can be seen that the HSS changes the registration state according to related protocol criterions, that is, the HSS learns the change of the registration state if the registration state of the UE is changed. Please refer to the related protocols for specific implementation.

According to related protocol criterions, in response to receiving the User Authorization Request/Location Inquiry Request (UAR/LIR) from the I-CSCF, the HSS inquiries about the subscriber registration information stored in the HSS, and determines, according to the current registration state of the UE, the S-CSCF Capabilities or S-CSCF Name to be returned. The HSS returns the I-CSCF the UAA message carrying the S-CSCF Capabilities, if the UE has not been allocated the S-CSCF Name, that is, the UE is in the not registered state, or the I-CSCF has not requested the S-CSCF Capabilities definitely; the HSS returns the UAA message carrying the S-CSCF Name to the I-CSCF, if the UE is in the registered state or the unregistered state, that is, the UE has been allocated the S-CSCF, the allocated S-CSCF has been stored in the HSS.

Steps 102-103 illustrate the first UAR/UAA procedure of the initial IMS registration procedure, and the UE has not completed the initial IMS registration at that time, i.e. the registration state of the UE recorded in the HSS is the not registered state; so the UAA message carrying the S-CSCF Capabilities is returned to the I-CSCF during the first UAR/UAA procedure of the initial IMS procedure.

Steps 104-105: The I-CSCF selects an S-CSCF according to the S-CSCF Capabilities carried in the UAA message, and sending the received first Register request to the selected S-CSCF.

According to related criterions of 3GPP TS 29.228 protocol and 3GPP TS 29.229 protocol, the capability set is expressed by using Attribute-Value Pairs (AVP). For the process of the I-CSCF selecting the S-CSCF according to the AVP, please refer to the related protocols, and no more description herein.

Steps 106-108: The S-CSCF sends a Multimedia Authentication Request (MAR) message to the HSS to request the authentication data of the UE; in response to generating Authentication Vectors (AVs), the HSS returns the S-CSCF a Multimedia Authentication Answer (MAA) message carrying the AVs.

The authentication of the UE depends on a pre-set share key which can be stored in an IP Multimedia Service ID Module (ISIM) of the UE and the HSS in the network. The S-CSCF needs to send the MAR message to the HSS to acquire the AVs when desiring to authenticate the subscriber, since the S-CSCF is used for authorizing subscribers.

In response to receiving the MAR message, the HSS sets a Pending Flag stored in the HSS to a Pending state, to indicate that the UE is in the authentication procedure currently, stores the S-CSCF Name of the S-CSCF selected for the UE carried in the MAR, and returns the MAA message carrying the generated AVs to the S-CSCF according to the S-CSCF Name of the S-CSCF selected for the UE.

The AVs requested by the S-CSCF from the HSS mainly includes: a random challenge (RAND), an expected result (XERS), a network authentication token (AUTN), an Integration Key (IK), and an Encrypt Key (CK).

Steps 109-113: The S-CSCF sends a 401 unauthorized response to the UE through the I-CSCF and the P-CSCF to challenge the UE; in response to completing the authentication challenge, the UE sends a second Register request carrying an authentication challenge response (RES) to the I-CSCF through the P-CSCF.

For authentication, the S-CSCF uses the 401 unauthorized response to refuse the first Register request initiated by the UE, and the 401 unauthorized response includes the AVs requested acquired from the HSS. The UE calculates the RES based on the share key stored in the local ISIM and the RAND in the received AVs, and sends the second Register request carrying the RES to the S-CSCF. Please refer to related protocols for a specific calculation method.

Steps 114-115: In response to receiving the second Register request, the I-CSCF initiates the UAR message to the HSS; the HSS returns the UAA message carrying the S-CSCF Capabilities or the S-CSCF Name to the I-CSCF according to the current subscriber registration state.

The specific implementation of the steps 114-115 is similar to that of the steps 102-103, so there is no more description.

It should be noted that, the current registration state of the UE stored in the HSS is still the not registered state, since the UE is in the initial IMS registration procedure at this time, and has not completed the registration yet. According to protocol criterions, the HSS still returns the I-CSCF the UAA message carrying the S-CSCF Capabilities, when the UE implements the second UAR/UAA procedure of the initial IMS registration procedure in the steps 114-115.

Step 116: The I-CSCF selects the S-CSCF according to the S-CSCF Capabilities carried in the UAA message, and sends the second Register request to the selected S-CSCF.

According to the steps 114-115, and step 116, since the UE has not completed the initial IMS registration, and the current registration state of the UE stored in the HSS is still the not registered state; the HSS, according to related protocol criterions, can only return the S-CSCF Capabilities to the I-CSCF by using the UAA message to carry the S-CSCF Capabilities. The I-CSCF can only re-select the S-CSCF according to the S-CSCF Capabilities carried in the UAA message. The process may bring a problem that the S-CSCF selected during the second UAR/UAA procedure may be different from the S-CSCF selected during the first UAR/UAA procedure in the steps 104-105. If the S-CSCF selected during the second UAR/UAA procedure is different from the S-CSCF selected during the first UAR/UAA procedure, the S-CSCF selected during the second UAR/UAA procedure will find no data related with the UE stored in itself, and initiate an initialization location registration process to the UE. Consequently, the UE can not implement the initial IMS registration procedure successfully if such a situation happens many times.

In step 116, the UE can continue to implement the authentication only when the S-CSCF selected by the I-CSCF according to the S-CSCF Capabilities carried in the UAA message and the S-CSCF selected in the steps 104-105 are the same.

Steps 117-119: The S-CSCF authenticates the UE according to the RES carried in the second Register request; if the UE passes the authentication, the S-CSCF sends a Subscriber Authentication Request (SAR) message to the HSS; in response to receiving the SAR message, the HSS returns a Subscriber Authentication Answer (SAA) message to the S-CSCF.

The S-CSCF compares the XRES in the AVs requested from the HSS in the steps 106-108 with the RES carried in the second Register request; if the XRES is the same as the RES, the S-CSCF determines that the UE passes the authentication; otherwise, the S-CSCF determines that the UE does not pass the authentication.

The S-CSCF Name is carried in the SAR message to notify the HSS of the S-CSCF providing services for the UE passing the authentication. In response to receiving the SAR message, the HSS changes the registration state of the UE stored in the HSS to the registered state.

Steps 120-122: The S-CSCF sends an accept registration 200 OK response to the UE through the I-CSCF and the P-CSCF, to accept the initial IMS registration initiated by the UE.

The inventors find in the inventing process that the method for implementing the initial IMS registration in the prior art has the following drawbacks: during the two UAR/UAA procedures, the subscriber registration state stored in the HSS is not changed, that is, the subscriber registration state stored in the HSS is the not registered state during the first UAR/UAA procedure, while the subscriber registration state stored in the HSS is still the not registered state during the second UAR/UAA procedure. Therefore, according to the protocol criterions, only the S-CSCF Capabilities is carried in the two UAA messages, the I-CSCF selects the S-CSCF according to the S-CSCF Capabilities, and the S-CSCF Name is not carried in the UAA message. Therefore, the I-CSCF has to re-select an S-CSCF in the second UAR/UAA procedure, and the S-CSCF re-selected by the I-CSCF is not ensured to be the same as the S-CSCF selected in the first UAR/UAA procedure. Therefore, in response to receiving the Register request, the S-CSCF re-selected by the I-CSCF may initiate an initialization location registration process to the UE for no information of the UE is found in S-CSCF re-selected by the I-CSCF. Consequently, the initial IMS registration can not be implemented successfully if such a situation happens many times.

SUMMARY OF THE INVENTION

Embodiments of the present invention provide methods for implementing an IP Multimedia Subsystem (IMS) registration, to guarantee that a same Service Call Session Control Function (S-CSCF) is selected in the two selections of the S-CSCF during the initial IMS registration procedure and further ensure the successful implementation of the initial IMS registration.

A method for implementing an IMS registration, includes: receiving, by a Home Subscriber Server (HSS), an Multimedia Authentication Request (MAR) message from an S-CSCF; wherein the S-CSCF is selected for a User Equipment (UE) when a first Register request is sent by the UE; recording, by the HSS, the current registration state of the UE, generating Authentication Vectors (AV) and sending the AVs to the S-CSCF; initiating, by the S-CSCF, an authentication challenge to the UE according to the AVs returned by the HSS; sending, by the UE, a second Register request to an Interrogating Call Session Control Function (I-CSCF), after the UE implements the authentication challenge; notifying, by the I-CSCF, the HSS of inquiring the subscriber registration state; and returning, by the HSS, an S-CSCF Name to the I-CSCF when the current registration state of the UE is an assigned S-CSCF state.

A method for implementing an IMS registration, includes: recording the current registration state of the UE and the S-CSCF Name of an S-CSCF in response to receiving an MAR request from the S-CSCF; receiving a Register request of a UE initiated by an I-CSCF; and returning the S-CSCF Name of the S-CSCF to the I-CSCF when the current registration state of the UE is an assigned S-CSCF state.

It can be seen from the above technical solution that, the HSS records the current registration state of the UE entering the authentication state as the assigned S-CSCF state, in response to receiving the MAR initiated by the S-CSCF during the initial IMS registration procedure; in response to receiving the UAR message initiated by the I-CSCF, the HSS returns an S-CSCF Name to the I-CSCF when the current registration state of the UE is an assigned S-CSCF state. It can be seen from the embodiments of the present invention that, if the UE has entered the authentication state and initiated the second Register request, during the second UAR/UAA procedure of the initial IMS registration procedure, the HSS returns the I-CSCF the UAA message carrying the S-CSCF Name selected during the first UAR/UAA procedure and stored in the HSS. Therefore, a same S-CSCF is ensured to be used during the two UAR/UAA procedures, and successful implementation of the initial IMS registration of the UE is ensured therefore.

DETAILED DESCRIPTION OF THE INVENTION

According to embodiments of the present invention, in an initial IMS registration procedure initiated by a UE, in response to receiving an MAR message initiated by an S-CSCF, an HSS records the current registration state of the UE entering the authentication procedure to an assigned S-CSCF state; in response to receiving a UAR message initiated by an I-CSCF, the HSS determines whether the current registration state of the UE recorded in the HSS is the assigned S-CSCF state; if the current registration state of the UE recorded in the HSS is the assigned S-CSCF state, the HSS sends a UAA message carrying an S-CSCF Name to the I-CSCF; otherwise, the HSS sends a UAA message carrying S-CSCF Capabilities to the I-CSCF.

The present invention is hereinafter further described in detail with reference to the accompanying drawings and preferred embodiments to further clarify the technical solutions and advantages thereof.

Figure 1:
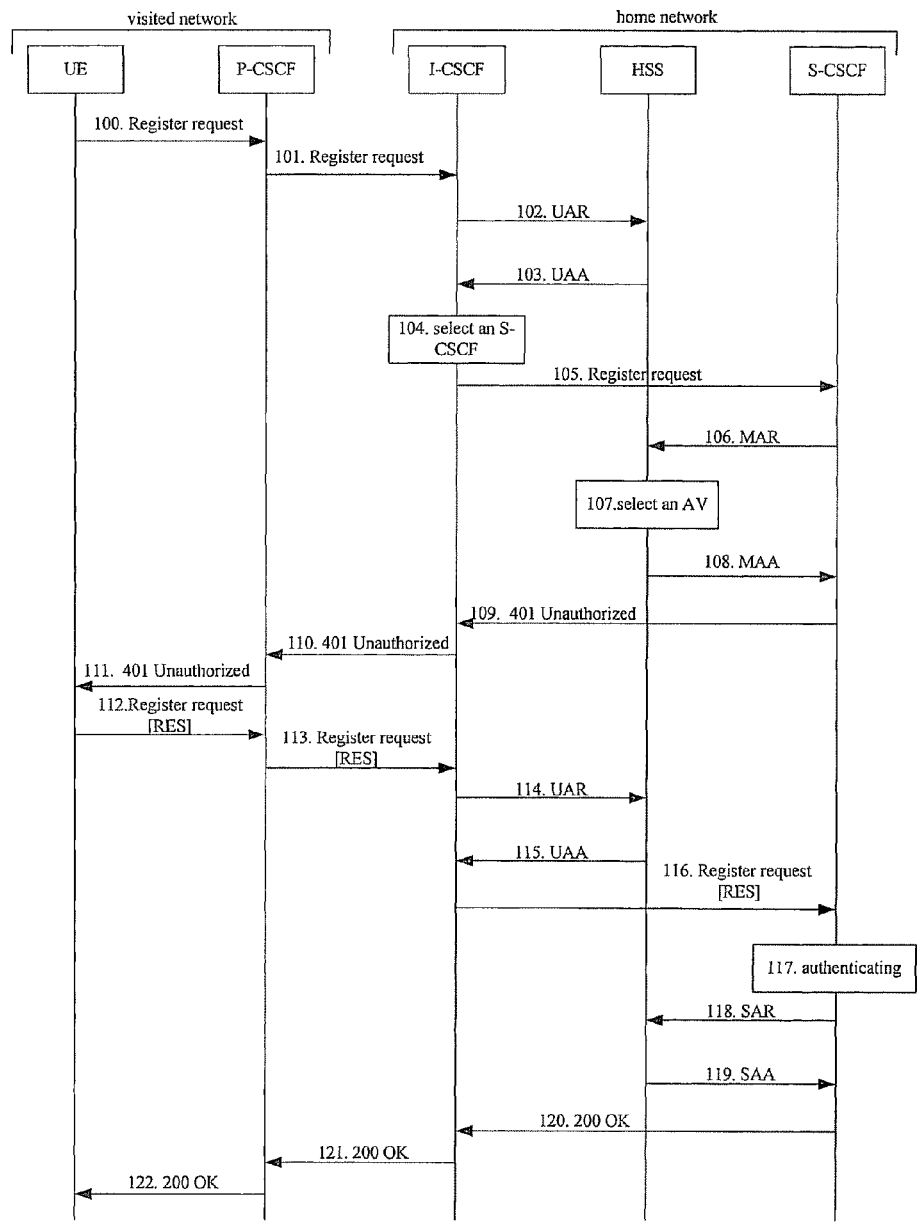
FIG. 1 is a flow chart illustrating the process of implementing an initial IMS registration in the prior art.
Figure 2:
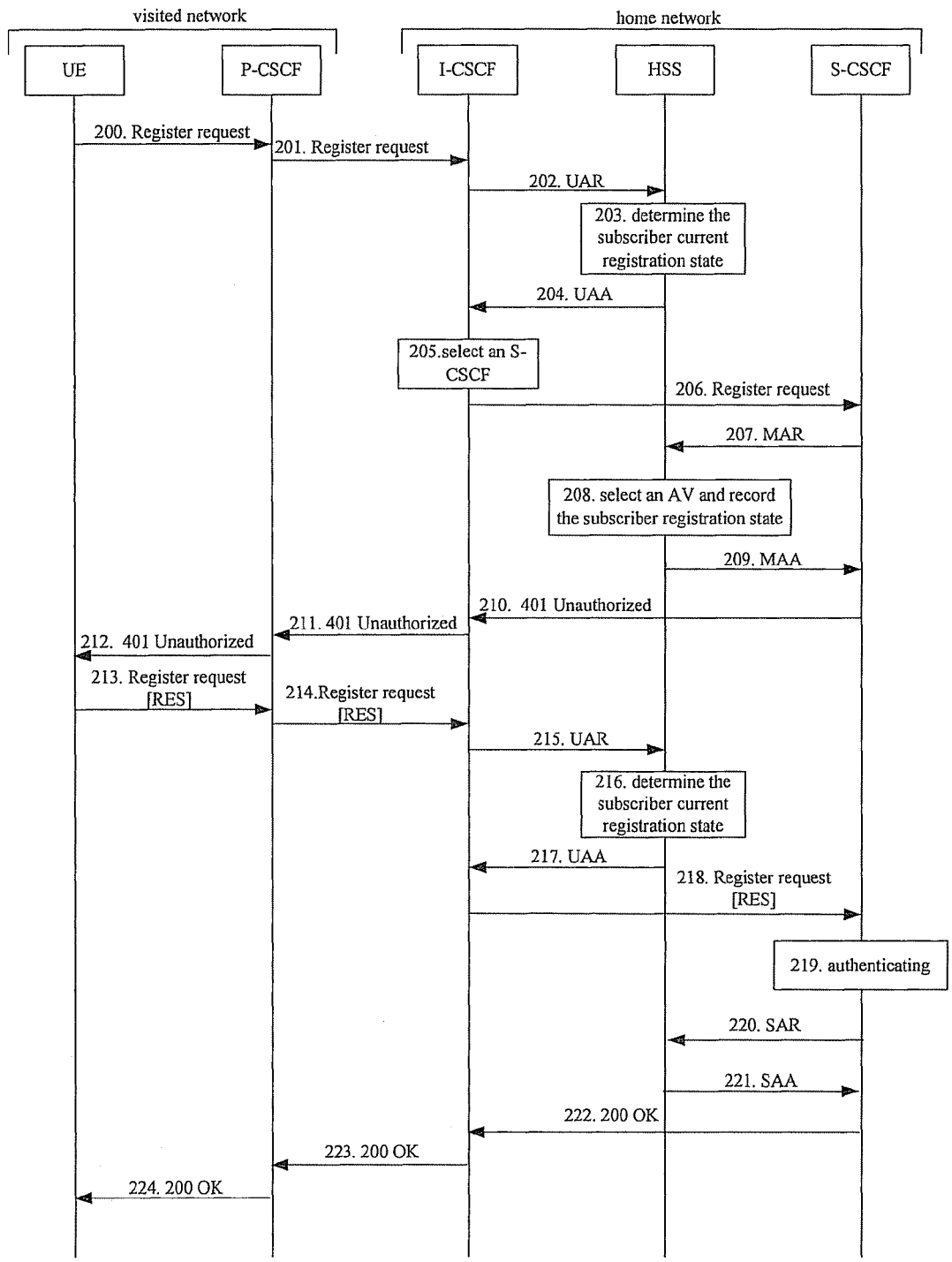
FIG. 2 is a flow chart illustrating the process of implementing an initial IMS registration according to an embodiment of the present invention.

FIG. 2 is a flow chart illustrating the process of implementing an initial IMS registration according to an embodiment of the present invention. If a UE has acquired an IP connection bearer, and found an interface of the IMS system before the initial IMS registration is implemented, a P-CSCF, the initial IMS registration includes steps as below.

Step 200: The UE sends a first Register request based on the SIP to the P-CSCF found by the UE.

Step 201: The P-CSCF forwards the first Register request to an I-CSCF.

The implementation of the steps 200-201 is similar to that of the steps 100-101 in the prior art, so there is no more description.

Step 202: The I-CSCF initiates a UAR message to an HSS.

Step 203: The HSS determines whether the current registration state of the UE is the assigned S-CSCF state according to the current registration state of the UE stored in the HSS.

Step 204: If the current registration state of the UE is the assigned S-CSCF state, the HSS sends a UAA message carrying an S-CSCF Name to the I-CSCF; otherwise, the HSS sends the UAA message carrying S-CSCF Capabilities to the I-CSCF.

According to the existing protocol criterions, a subscriber has three registration states: the not registered state, the registered state, and the unregistered state. However, according to the embodiment of the present invention, subscriber has four registration states: the not registered state, the registered state, the unregistered state, and an authentication state which is newly-added, and the authentication state is a subscriber registration state for indicating that a UE is in the authentication procedure. According to the embodiment of the present invention, the registered state, the unregistered state, and the authentication state all belong to the assigned S-CSCF state. The current registration state of the UE can be determined through three methods as below.

Method I: Determining the current registration state of the UE according to the three subscriber registration states prescribed in the existing protocols and the state of a Pending Flag.

Figure 3:
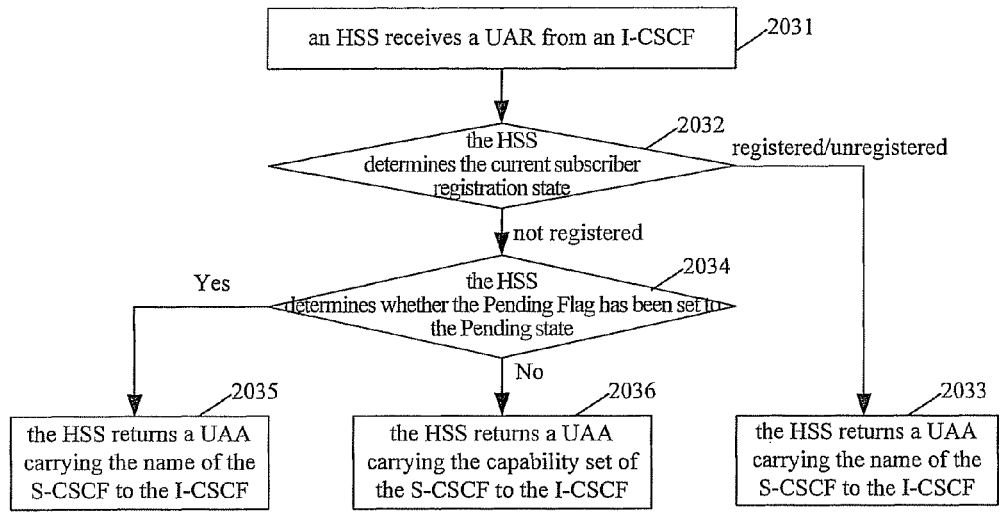
FIG. 3 is a flow chart illustrating a method for determining a subscriber registration state in the initial IMS registration procedure according to an embodiment of the present invention.

FIG. 3 is a flow chart illustrating a method for determining a subscriber registration state in the initial IMS registration procedure according to an embodiment of the present invention, including the following steps.

Step 2031: The HSS receives the UAR message from the I-CSCF.

Step 2032: The HSS determines the current registration state of the UE stored in the HSS; if the current registration state of the UE is the registered state or the unregistered state, proceeding to step 2033; if the current registration state of the UE is the not registered state, proceeding to step 2034.

Step 2033: The HSS returns the I-CSCF the UAA message carrying the S-CSCF Name stored in the HSS.

Step 2034: The HSS determines whether the Pending Flag stored in the HSS has been set to the Pending state; if the Pending Flag stored in the HSS has been set to the Pending state, proceeding to step 2035; otherwise, proceeding to step 2036.

Step 2035: The HSS returns the I-CSCF the UAA message carrying the S-CSCF Name stored in the HSS.

Step 2036: the HSS returns the I-CSCF the UAA message carrying the S-CSCF Capabilities stored in the HSS.

In the steps 2034-2036, although the current registration state of the UE is the not registered state, it means that the UE is being authenticated, that is, the UE is in the authentication state if the Pending Flag stored in the HSS is set to the Pending state, and the authentication state belongs to the assigned S-CSCF state provided by embodiments of the present invention. This is why the current registration state of the UE is the not registered state and the Pending Flag is set to the Pending state, the HSS returns the UAA message carrying the S-CSCF Name stored in the HSS to the I-CSCF.

The UAR/UAA procedure in the steps 203-204 is the first UAR/UAA procedure of the initial IMS registration. In this procedure the UE just enters the initial IMS registration, that is, the UE is in the not registered state, and the Pending Flag has not been set to the Pending state; so the UAA message carrying the S-CSCF Capabilities is returned to the I-CSCF.

The specific process of recording the current registration state of the UE is described in an MAR/MAA procedure in steps 207-209.

Method II: Determining the current registration state of the UE according to the subscriber registration state recorded.

According to the Method II, a registration state indicating that the UE is in the authentication procedure, that is, the Authentication pending state, should be added. Therefore, according to the Method II, the UE has four registration states: the not registered state, the registered state and the unregistered state which are prescribed in the existing protocols, and the Authentication pending state newly-added. The specific process of recording the current registration state of the UE is described in the MAR/MAA procedure in steps 207-209.

During the UAR/UAA procedure in the steps 203-204, the HSS just determines whether the S-CSCF Name or the S-CSCF capabilities is carried in the UAA message according to the current registration state of the UE stored in the HSS. If the current registration state of the UE is the assigned S-CSCF state, for example, the Authentication pending state, the unregistered state, or the registered state, the HSS returns the UAA message carrying the S-CSCF Name stored in the HSS to the I-CSCF; otherwise, the HSS returns the UAA message carrying the S-CSCF Capabilities stored in the HSS to the I-CSCF.

Similarly, when the Method II is used, the UAR/UAA procedure in the steps 203-204 is the first UAR/UAA procedure of the initial IMS registration procedure and the UE has just entered the initial IMS registration at this time, that is, the UE is in the not registered state; so the UAA message carries the S-CSCF Capabilities. The specific process of recording the current registration state of the UE is described in the MAR/MAA procedure in steps 207-209.

Method III: Determining the current registration state of the UE according to the three subscriber registration states prescribed in the existing protocols and whether the HSS stores the S-CSCF Name.

Generally, the UE has a unique private subscriber ID identified by an IP Multimedia Private Identity (IMPI), and multiple public subscriber ids identified by different IP Multimedia Public Identities (IMPUs).

The Method III includes the following steps:

In response to receiving the UAR message from the I-CSCF, the HSS determines the current registration state of the UE stored in the HSS; if a current public subscriber ID registration state of the UE is the registered state, the unregistered state, or the not registered state, but one or more of the other public subscriber ID registration states of the UE are the registered state or the unregistered state, the current registration state of the UE is the assigned S-CSCF state; therefore, the HSS returns the I-CSCF the UAA message carrying the S-CSCF Name stored in the HSS; if the current public subscriber ID registration state of the UE is the not registered state, and none of the other public subscriber ID registration states of the UE is the registered state or the unregistered state, the HSS further determines whether the HSS stores the S-CSCF Name for the UE; if the HSS stores the S-CSCF Name selected for the UE, the current registration state of the UE is the assigned S-CSCF state; therefore, the HSS returns the I-CSCF the UAA message carrying the S-CSCF Name stored in the HSS; if the HSS does not store the S-CSCF Name selected for the UE, the HSS returns the I-CSCF the UAA message carrying the S-CSCF Capabilities stored in the HSS.

It should be noted that, although the current registration state of the UE is the not registered state, it means that the UE is being authenticated, that is, the UE is in the authentication state if there is the HSS storing the S-CSCF Name for the UE; and the authentication state belongs to the assigned S-CSCF state provided by the embodiment of the present invention. In other words, when the current registration state of the UE is the not registered state, and the HSS stores the S-CSCF Name, the HSS returns the I-CSCF the UAA carrying the S-CSCF Name.

Similarly, when the Method III is used, the UAR/UAA procedure in the steps 203-204 is the first UAR/UAA procedure of the initial IMS registration procedure, the UE has just entered the initial IMS registration at this time, that is, the UE is in the not registered stat, and S-CSCF Name is not stored in the HSS; so, the UAA message carrying the S-CSCF Capabilities is returned to the I-CSCF.

Step 205: The I-CSCF selects the S-CSCF according to the S-CSCF Capabilities carried in the UAA message, Step 206: The I-CSCF sends the first Register request received to the S-CSCF selected.

The implementation of the steps 205-206 is similar to that of the steps 104-105 in the prior art, so there is no more description.

Step 207: The S-CSCF sends an MAR message to the HSS to request the UE's authentication data.

Step 208: The HSS generates AVs and records the current registration state of the UE.

Step 209: The HSS returns the S-CSCF an MAA message carrying the AVs.

The implementation of the steps 207-209 is basically similar to that of steps 106-108 in the prior art. In response to receiving the MAR message, the HSS sets the Pending Flag stored in the HSS to the Pending state, to indicate that the UE is in the authentication procedure currently, stores the S-CSCF Name carried in the MAR message, and returns the MAA message carrying the generated AVs to the S-CSCF according to the S-CSCF Name carried in the MAR message.

What is different from the prior art is that, the HSS records the current registration state of the UE in the HSS, besides all processes in the steps 106-108 in the prior art. Besides setting the Pending Flag to the Pending state to indicate that the UE is in an authentication state of an initial IMS registration, and stores the S-CSCF Name carried in the MAR message, an embodiment of the present invention provides another mother for recording the current registration state of the UE.

Figure 4:
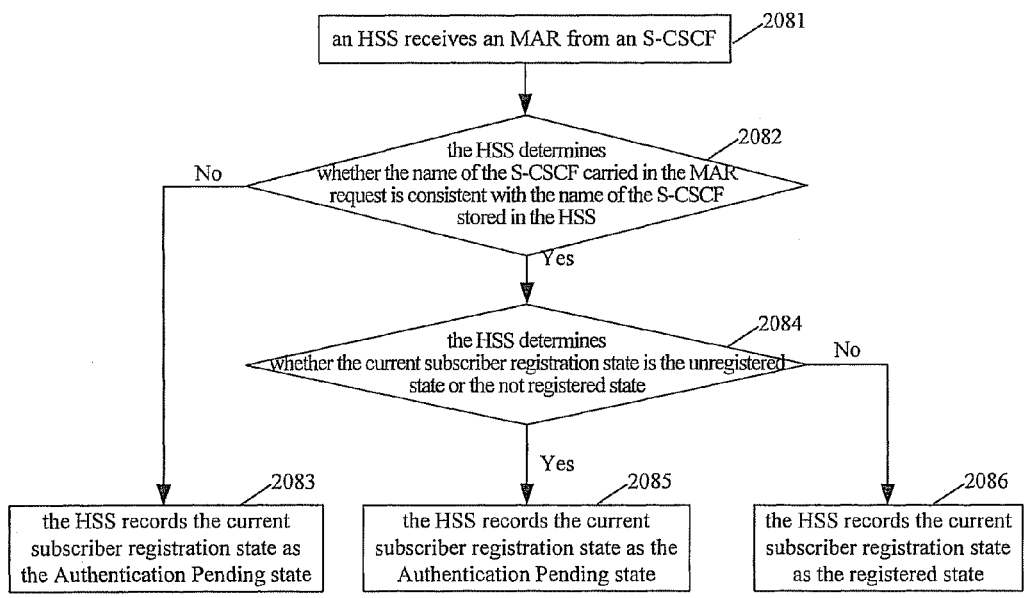
FIG. 4 is a flow chart illustrating a method for recording a subscriber registration state in the initial IMS registration procedure according to an embodiment of the present invention.

FIG. 4 is a flow chart illustrating a method for recording a subscriber registration state in the initial IMS registration procedure according to an embodiment of the present invention. In the method for recording a subscriber registration state as shown in FIG. 4, pre-setting an Authentication Pending state is to indicate that the UE is in the authentication state of the initial IMS registration currently. And the method includes the following steps.

Step 2081: The HSS receives the MAR message from the S-CSCF.

Step 2082: The HSS determines whether the S-CSCF Name carried in the MAR message is consistent with the S-CSCF Name stored in the HSS; if the S-CSCF Name carried in the MAR message is not consistent with the S-CSCF Name stored in the HSS, proceeding to step 2083; otherwise, proceeding to step 2084.

Step 2083: The HSS records the current registration state of the UE as the Authentication Pending state.

If the S-CSCF Name of the S-CSCF providing the service for the UE is stored in the HSS, but the S-CSCF Name carried in the MAR message from the S-CSCF is not consistent with the S-CSCF Name stored in the HSS, it can be determined according to related protocol criterions that the UE having completed the initial IMS registration must be roaming or the like and re-gains a new S-CSCF in the roaming. Therefore, the current registration state of the UE recorded in the HSS is the Authentication Pending state.

Step 2084: The HSS determines whether the current registration state of the UE is the unregistered state or the not registered state; if the current registration state of the UE is the unregistered state or the not registered state, proceeding to step 2085; otherwise, proceeding to step 2086.

Step 2085: The HSS changes the current registration state of the UE to the Authentication Pending state.

Step 2086: The HSS records the current registration state of the UE as the registered state.

According to the process of recording the subscriber registration state as shown in FIG. 4, the UE's registration state is recorded as the Authentication Pending state, or the registered state as long as the UE enters the authentication state. The UE's registration state stored in the HSS is ensured to be the assigned S-CSCF state during the second UAR/UAA procedure, in other words, a same S-CSCF is used during the two UAR/UAA procedures, by carrying the S-CSCF Name stored in the HSS in the UAA message during the first UAR/UAA procedure, to provide the registration service for the UE; thereby ensuring the successful implementation of the initial IMS registration of the UE.

It should be noted that, the subscriber public subscriber ID registration state is the not registered state in the steps 207-209, and in response to receiving and processing the MAR message sent by the S-CSCF, the HSS stores the S-CSCF Name, i.e. the S-CSCF Name corresponding to the S-CSCF selected during the first UAR/UAA procedure. If the HSS, in response to receiving and processing the MAR message sent by the S-CSCF, triggers the process in which the IMS subscriber serves as the called party, i.e. the LIR/LIA process, which is independent with IMS registration process, the subsequent process of the IMS registration process continues to be implemented. The subsequent process includes according to the criterions of the 3GPP TS 29.228 v6.7.0 protocol: the HSS returning the I-CSCF a subscriber LIA message carrying the S-CSCF Capabilities in response to receiving a subscriber LIR message from the I-CSCF, since the public subscriber ID registration state corresponding to the subscriber is the not registered state; the I-CSCF selecting an S-CSCF according to the received S-CSCF Capabilities, sending a session initialization (INVITE) message to the S-CSCF selected currently, and proceeding to the LIR/LIA process. The process according to the prior art can not guarantee the consistency of the S-CSCF selected by the I-CSCF during the LIR/LIA procedure with the S-CSCF selected by the HSS during the first UAR/UAA procedure; therefore, the INVITE message can not be sent to the S-CSCF selected during the first UAR/UAA procedure. As a result, the S-CSCF initiates the initialization location registration process if finding no the UE. Consequently, the LIR/LIA can not be implemented successfully if such a situation happens many times.

If the Method III is used to determine the current registration state of the UE, the HSS triggers a process in which the IMS subscriber serves as the called party in response to receiving and processing the MAR message sent by the S-CSCF, and the process includes: in response to receiving the LIR message from the I-CSCF, the HSS determining that the current registration state of the UE is the authentication state, since the public subscriber ID registration state corresponding to the subscriber is the not registered state, and the S-CSCF Name is stored in the HSS for the UE; the HSS returning the I-CSCF the LIA message carrying the S-CSCF Name; and the I-CSCF sending the INVITE message to the S-CSCF corresponding to the S-CSCF Name received, and implementing the LIR/LIA process according to protocols. Obviously, according to this method, when the initial IMS registration procedure is not completed, and the LIR/LIA process is triggered, the I-CSCF is enabled to forward the corresponding message in the LIR/LIA process to the S-CSCF allocated for the subscriber, thereby ensuring the successful implementation of the LIR/LIA process.

If the Method II is used to determine the current registration state of the UE, the HSS triggers a process in which the IMS subscriber serves as the called party in response to receiving and processing the MAR message sent by the S-CSCF, and the process includes: in response to receiving the LIR message from the I-CSCF, the UE's registration state is recorded as either the Authentication Pending state or the registered state, and the UE's registration state stored in the HSS is the assigned S-CSCF state, since the UE has already been in the authentication state; the HSS returning the I-CSCF the LIA message carrying the S-CSCF Name stored in the HSS; and the I-CSCF sending the INVITE message to the S-CSCF corresponding to the S-CSCF Name received, and implementing the LIR/LIA process according to protocols. Obviously, when the initial IMS registration procedure is not completed, and the LIR/LIA process is triggered, the I-CSCF is enabled to forward the corresponding message in the LIR/LIA process to the S-CSCF allocated for the subscriber, thereby ensuring the successful implementation of the LIR/LIA process.

If the Method I is used to determine the current registration state of the UE, the HSS triggers a process in which the IMS subscriber serves as the called party in response to receiving and processing the MAR message sent by the S-CSCF, and the process includes: in response to receiving the LIR message from the I-CSCF, the current registration state of the UE is the not registered state, but the Pending Flag stored in the HSS is set to the Pending state, it means that the UE is being authenticated, that is, the UE is in the authentication state; the HSS returning the I-CSCF the LIA message carrying the S-CSCF Name stored in the HSS; and the I-CSCF sending the INVITE message to the S-CSCF corresponding to the S-CSCF Name received, and implementing the LIR/LIA process according to protocols. Obviously, when the initial IMS registration procedure is not completed, and the LIR/LIA process is triggered, the I-CSCF is enabled to forward the corresponding message in the LIR/LIA process to the S-CSCF allocated for the subscriber, thereby ensuring the successful implementation of the LIR/LIA process.

Steps 210-212: The S-CSCF sends a 401 unauthorized response to the UE through the I-CSCF and the P-CSCF, to challenge the UE;

Steps 213-214: The UE sends a second Register request carrying the RES to the I-CSCF through the P-CSCF.

The specific implementation of the steps 210-214 is similar to that of the steps 109-113 in the prior art, so there is no more description.

Step 215: The I-CSCF initiates to an HSS a UAR message.

Step 216: The HSS determines whether the current registration state of the UE is the assigned S-CSCF state according to the current registration state of the UE stored in the HSS.

Step 217: If the current registration state of the UE is the assigned S-CSCF state, the HSS sends a UAA message carrying an S-CSCF Name to the I-CSCF; otherwise, the HSS sends the UAA message carrying S-CSCF Capabilities to the I-CSCF.

The specific implementation of the steps 216-217 is similar to that of the steps 203-204, so there is no more description.

It should be noted that, if the method I in the steps 203-204 is used to determine the current registration state of the UE, because the UAR/UAA procedure in the steps 216-217 is the second UAR/UAA procedure of the initial IMS registration, the UE's registration state recorded in the HSS is still the not registered state, but the Pending Flag has been set to the Pending state; according to the process of steps 2034-2036 of the Method I, the UE is still in the authentication state. The HSS returns the I-CSCF the S-CSCF Name selected during the first UAR/UAA procedure and stored in the HSS in steps 207-209.

If the Method II in the steps 203-204 is used to determine the current registration state of the UE, because in the steps 207-209, the current registration state of the UE is recorded as the Authentication Pending state or the registered state. The HSS returns the I-CSCF the UAA message carrying the S-CSCF Name selected during the first UAR/UAA procedure and stored in the HSS in the steps 207-209.

If the Method III in the steps 203-204 is used to determine the current registration state of the UE, the UE is in the authentication state according to the process of Method III, since the UAR/UAA procedure in the steps 216-217 is the second UAR/UAA procedure of the initial IMS registration procedure, the UE's registration state recorded in the HSS is still the not registered state, but the S-CSCF Name of the S-CSCF selected during the first UAR/UAA procedure is stored in the HSS. The HSS returns the I-CSCF the UAA message carrying the S-CSCF Name.

Step 218: The I-CSCF sends the second Register request to the S-CSCF corresponding to the S-CSCF Name according to the S-CSCF Name carried in the UAA message.

According to the process in steps 216-217, and step 218, the HSS returns the S-CSCF Name of the S-CSCF selected during the first UAR/UAA procedure and stored in the HSS to the I-CSCF during the second UAR/UAA procedure, by recording different UE's registration states, and the second Register request from the UE is ensured to be successfully sent to the S-CSCF receiving the first Register request, and the successful implementation of the UE's initial IMS registration is ensured.

Step 219: The S-CSCF authenticates the UE according to the RES carried in the second Register request.

Step 220: If the UE passes the authentication, the S-CSCF sends an SAR message to the HSS.

Step 221: The HSS returns an SAA message to the S-CSCF in response to receiving the SAR message.

The specific implementation of the steps 219-221 is similar to that of the steps 117-119 in the prior art, so there is no more description.

Steps 222-224: The S-CSCF sends a 200 OK answer to the UE through the I-CSCF and the P-CSCF to accept the initial IMS registration initiated by the UE.

The specific implementation of the steps 222-224 is similar to that of the steps 120-122 in the prior art, so there is no more description.

The above are only preferred embodiments of the present invention and are not for use in limiting the present invention. Any modification, equivalent replacement or improvement made under the spirit and principles of the present invention is included in the protection scope of the present invention.

What is claimed is:

1. A method for implementing an Internet Protocol (IP) Multimedia Subsystem (IMS) registration, comprising:
   receiving, by a Home Subscriber Server (HSS), an Multimedia Authentication Request (MAR) message from a Service Call Session Control Function (S-CSCF); wherein the S-CSCF is selected for a User Equipment (UE) when a first Register request is sent by the UE;
   recording, by the HSS, the current registration state of the UE, generating Authentication Vectors (AV) and sending the AVs to the S-CSCF;
   initiating, by the S-CSCF, an authentication challenge to the UE according to the AVs returned by the HSS;
   sending, by the UE, a second Register request to an Interrogating Call Session Control Function (I-CSCF), after the UE implements the authentication challenge;
   notifying, by the I-CSCF, the HSS of inquiring the subscriber registration state; and
   returning, by the HSS, an S-CSCF Name to the I-CSCF when the registration state of the UE is not registered and the pending flag is set to pending state, wherein the pending flag is set to pending state for indicating that the UE is in the authentication procedure.

2. The method of claim 1, further comprising:
   sending, by the I-CSCF, the second Register request to the S-CSCF according to the S-CSCF Name returned by the HSS; and
   changing, by the S-CSCF, the current registration state of the UE to a registered state, after the S-CSCF authenticates the UE.

3. The method of claim 1, further comprising:
   before receiving by the HSS the MAR message from the S-CSCF,
      sending, by the UE, the first Register request to the I-CSCF through a Proxy Call Session Control Function (P-CSCF);
      notifying, by the I-CSCF, the HSS of inquiring the subscriber registration state, in response to receiving the first Register request;
      returning, by the HSS, S-CSCF Capabilities to the I-CSCF;
      selecting, by the I-CSCF, the S-CSCF according to the S-CSCF Capabilities and storing the S-CSCF Name of the S-CSCF; and
      sending, by the I-CSCF, the first Register request to the S-CSCF.

4. The method of claim 3, wherein the notifying by the I-CSCF the HSS of inquiring the subscriber registration state in response to receiving the first Register request comprises:
   sending, by the I-CSCF, a User Authentication Request (UAR) message to the HSS; and
   the returning by the HSS the S-CSCF Capabilities to the I-CSCF comprises:
   sending, by the HSS, a User Authentication Answer (UAA) message carrying the S-CSCF Capabilities to the I-CSCF.

5. The method of claim 1, wherein the notifying by the I-CSCF the HSS of inquiring the subscriber registration state comprises:
   sending, by the I-CSCF, a User Authorization Request (UAR) message to the HSS; and
   the returning by the HSS the S-CSCF Name to the I-CSCF comprises:
   sending, by the HSS, a User Authentication Answer (UAA) message carrying the S-CSCF Name to the I-CSCF.

6. The method of claim 1, wherein the receiving the MAR message from the S-CSCF comprises:
   receiving, by the HSS, the MAR message carrying the S-CSCF Name of the S-CSCF; and
   the returning by the HSS the AVs comprises:
   sending, by the HSS, the S-CSCF a Multimedia Authentication Answer (MAA) message carrying the AVs generated.

7. The method of claim 1, further comprising:
receiving, by the HSS, a subscriber Location Inquiry Request (LIR) message from the I-CSCF in response to recording the current registration state of the UE;
returning, by the HSS, the I-CSCF a Location Inquiry Answer (LIA) message carrying the S-CSCF Name if a current registration state of the UE is a not registered state, and a Pending Flag stored in the HSS is in a Pending state; and
sending, by the I-CSCF, a session initialization (INVITE) message to the S-CSCF corresponding to the S-CSCF Name carried in the LIA message.

8. A method for implementing an Internet Protocol (IP) Multimedia Subsystem (IMS) registration, comprising:
receiving, by a Home Subscriber Server (HSS), an Multimedia Authentication Request (MAR) message from a Service Call Session Control Function (S-CSCF); wherein the S-CSCF is selected for a User Equipment (UE) when a first Register request is sent by the UE;
recording, by the HSS, the current registration state of the UE, generating Authentication Vectors (AV) and sending the AVs to the S-CSCF,
initiating, by the S-CSCF, an authentication challenge to the UE according to the AVs returned by the HSS;
sending, by the UE, a second Register request to an Interrogating Call Session Control Function (I-CSCF), after the UE implements the authentication challenge;
notifying, by the I-CSCF, the HSS of inquiring the subscriber registration state; and
returning, by the HSS, the S-CSCF Name to the I-CSCF when the registration state of the UE is an authentication state, wherein the authentication state is a subscriber registration state for indicating that a UE is in the authentication procedure.

9. The method of claim 8, further comprising:
receiving, by the HSS, a subscriber Location Inquiry Request (LIR) message from the I-CSCF in response to recording the current registration state of the UE;
returning, by the HSS, the I-CSCF a Location Inquiry Answer (LIA) message carrying the S-CSCF Name, if the current registration state of the UE is the authentication state; and
sending, by the I-CSCF, an INVITE message to the S-CSCF corresponding to the S-CSCF Name carried in the LIA message.

* * * * *